US008545967B2

(12) United States Patent
Holzmüller et al.

(10) Patent No.: US 8,545,967 B2
(45) Date of Patent: Oct. 1, 2013

(54) MULTI COATED METAL SUBSTRATE AND METHOD FOR THE PRODUCTION THEREOF

(75) Inventors: Manfred Holzmüller, Weingarten (DE); Simone Cortellaro, Düsseldorf (DE); Ulrich Jüptner, Hilden (DE); Marcel Roth, Düsseldorf (DE); Peter Kuhm, Hilden (DE); Patrick Droniou, Colombes (FR); Pamela Cziesla, Stein-Neukirch (DE); Giorgio Cortellaro, Düsseldorf (DE)

(73) Assignee: Henkel AG & Co. KGaA, Duesseldorf (DE)

( * ) Notice: Subject to any disclaimer, the term of this patent is extended or adjusted under 35 U.S.C. 154(b) by 418 days.

(21) Appl. No.: 12/561,648

(22) Filed: Sep. 17, 2009

(65) Prior Publication Data

US 2010/0112302 A1 May 6, 2010

Related U.S. Application Data

(63) Continuation of application No. PCT/EP2007/063332, filed on Dec. 5, 2007.

(30) Foreign Application Priority Data

Mar. 28, 2007 (DE) ......................... 10 2007 015 393

(51) Int. Cl.

| | |
|---|---|
| ***C09J 7/02*** | (2006.01) |
| ***B60J 10/02*** | (2006.01) |
| ***C08J 5/18*** | (2006.01) |
| ***C08K 3/22*** | (2006.01) |
| ***B32B 15/08*** | (2006.01) |
| ***B05D 3/00*** | (2006.01) |

(52) U.S. Cl.
USPC ........ 428/189; 428/192; 428/425.8; 428/457; 428/458; 428/461; 428/328; 428/330; 427/189

(58) Field of Classification Search
USPC .............. 428/189, 192, 328, 330, 425.8, 457, 428/458, 461
See application file for complete search history.

(56) References Cited

U.S. PATENT DOCUMENTS

| | | | | |
|---|---|---|---|---|
| 4,103,049 | A * | 7/1978 | Nishida et al. | 427/341 |
| 4,457,956 | A * | 7/1984 | Park | 427/203 |
| 5,486,414 | A * | 1/1996 | Roberto et al. | 428/334 |
| 6,165,561 | A * | 12/2000 | Blum et al. | 427/409 |
| 6,312,820 | B1 | 11/2001 | Hall | |
| 6,645,633 | B2 * | 11/2003 | Weller et al. | 428/418 |
| 6,835,459 | B2 * | 12/2004 | Lorenz et al. | 428/469 |

FOREIGN PATENT DOCUMENTS

| | | | |
|---|---|---|---|
| DE | 102006039633 | A1 | 3/2008 |
| DE | 102007001653 | A1 | 7/2008 |
| GB | 2112409 | A * | 12/1981 |
| WO | 9602384 | A1 | 2/1996 |
| WO | 9707163 | A1 | 2/1997 |
| WO | 9924515 | A1 | 5/1999 |
| WO | 0130923 | A2 | 5/2001 |
| WO | 0185860 | A1 | 11/2001 |
| WO | 03026888 | A1 | 4/2003 |
| WO | 03042275 | A1 | 5/2003 |

OTHER PUBLICATIONS

SAE Internataional Technical Paper, Willaim E Fristad& Omar Abu-Shanab, "Autodeposition Coatings: How aand Why they Perform" Apr. 16, 2007.*
International Search Report dated Jun. 13, 2008, PCT International Application PCT/EP2007/063332.

* cited by examiner

*Primary Examiner* — Kevin R Kruer
(74) *Attorney, Agent, or Firm* — Mary K. Cameron

(57) ABSTRACT

A metal sheet, inclusive of a metal strip, having a front side and a back side, both the front side and the back side comprising a first coating having an average thickness in the range from 0.5 to 10 μm, wherein the first coating of the front side contains particles, which release divalent or multivalent metal ions upon the action of an acid, in such an amount that a self-depositing coating agent forms, upon contact with the front side, a second coating thereon, whereas this is not the case for the first coating of the back side. The first coating of the front side can be overcoated with a self-depositing coating agent. Cut edges that do not have a first coating can be covered with the self-depositing coating agent. Correspondingly coated metal sheets, as well as a method for the manufacture thereof, are furthermore within the scope of the invention.

28 Claims, No Drawings

MULTI COATED METAL SUBSTRATE AND METHOD FOR THE PRODUCTION THEREOF

This application is a continuation under 35 U.S.C. Sections 365(c) and 120 of International Application No. PCT/EP2007/063332, filed Dec. 5, 2007 and published on Oct. 2, 2008 as WO 2008/116510, which claims priority from German Patent Application No. 102007015393.9 filed Mar. 28, 2007, which are incorporated herein by reference in their entirety.

FIELD OF THE INVENTION

The present invention relates to a metal substrate that comprises, for corrosion protection, at least two different coatings; to a method for manufacturing such a metal substrate; and to the use of such a metal substrate for the manufacture of articles.

BACKGROUND OF THE INVENTION

Base metals must be protected from corrosion. This applies to all usual structural metals such as iron, steel, zinc, titanium, aluminum, magnesium, or alloys thereof. These metals are usually equipped with one or more inorganic and/or organic coatings. In addition to corrosion protection, desirable aesthetic effects are also achieved in this context. A variety of coating types and coating methods are known and widespread in the existing art for this.

For example, it is usual to subject metal surfaces (cleaned, if necessary) to a so-called conversion treatment. In this, a coating forms into which ions of the metal surface are incorporated. Examples of this are chromating, layer-forming or non-layer-forming phosphating, or treatment with an acidic aqueous solution of complex fluorides of at least one of the elements B, Si, Ti, and/or Zr. Such conversion solutions can additionally contain organic polymers.

For a mild or merely temporary corrosion stress it may be sufficient to limit oneself to such a conversion treatment. As a rule, however, the conversion-treated metal surfaces are covered with one or more organic coatings of differing thicknesses. These organic coatings generally contain (crosslinked) organic polymers. With a suitably selected organic coating agent, however, a conversion treatment can also be omitted. This means that an organic coating agent based on (by preference, crosslinked or crosslinking) polymers can also be applied directly onto a bare metal surface. Different types of organic coating agents are known for this purpose. Crosslinking of the organic polymers is generally accomplished by way of one or more of the following reaction types: polymerization of compounds having multiple carbon-carbon bonds, formation of urethane bonds by reaction of isocyanates, ring-opening reaction of epoxies, formation of polyesters.

Crosslinking reactions of this kind can occur on the coated sheet upon, for example, thermally or radiation-chemically induced curing of the coating. It is also possible, however, to use coating agents which already contain crosslinked organic polymers that are dissolved or dispersed in a liquid medium. The final coating is created by so-called "drying" upon evaporation of the liquid medium.

The organic coating agents and coatings formed therewith can contain, in addition to the organic polymers, further components that improve the chemical and physical properties of the coating. For example, inorganic and/or organic pigments are often used for coloring, to adjust tribological properties, and/or for improved corrosion protection. One particular class of pigments is the so-called "conductivity pigments." These impart to the coating sufficient electrical conductivity that the coated metal sheet can be electrically welded and/or coated with an electrocoating paint. Examples of such conductivity pigments are: powdered elemental metals such as, for example, iron, zinc, aluminum, nickel, manganese, magnesium, or alloys thereof; metal phosphides; metal sulfides; metal oxides; graphite; and carbon black. Coating agents of this kind, with which conductive organic coatings can be constituted on metal substrates, are described below.

Also known are so-called "self-depositing" coating agents. Examples of these are described in the documents WO 97/07163, U.S. Pat. No. 6,312,820, WO 03/026888, WO 03/042275, and the literature cited therein. The process of self-deposition (also referred to as autodeposition) is based on the fact that by the action of an acid in the coating agent, divalent or polyvalent metal ions are dissolved out of the metal surface to be coated. The dissolved metal ions react with negatively charged groups of organic polymers suspended in the coating agent. As a result, the suspension of the organic polymers is destabilized, and the suspended polymer particles coagulate and precipitate as a film on the metal surface. This process stops automatically when the metal surface is completely covered with the polymer film, so that no further acid attack on the metal surface can occur. The polymer layer thus produced on the metal surface is baked and cured in a subsequent step. This produces layers that generally have a thickness in the range from 5 to 25 μm.

The formation of an autophoretically deposited coating thus requires that divalent or polyvalent metal ions, which destabilize the polymer emulsion, can be dissolved out of the substrate. This is usually accomplished by allowing the self-depositing coating agent to act on a bare metal surface. An alternative to this, which results in a double coating, is described in WO 96/02384. According to this document, a metal surface is firstly covered with a first coating that contains a powdered metal. In a second step, a second, self-depositing coating is deposited onto this first layer. This is evidently possible because, upon action of the acid contained in the second coating agent, a sufficient quantity of divalent or polyvalent metal ions is dissolved out of the powdered metal in the first coating to allow the self-depositing coating agent to deposit as a second coating. For concrete examples of first and second coating agents for the formation of this double coating, reference is made to the aforesaid document.

SUMMARY OF THE INVENTION

The present invention further develops the teaching of WO 96/02384. It achieves the object of depositing a second coating onto a first coating only where it is necessary as a result of increased corrosive stress. This is intended to avoid unnecessary coating, and thus unnecessary use of material. A development of the idea of the present invention also achieves the further object of equipping cut edges on previously coated metal sheets with a sufficient corrosion-protecting coating. The result is to achieve sufficient corrosion protection in crimped or flanged regions of a component fabricated from such a sheet, with no need for additional sealing.

In a first aspect, the present invention relates to a metal sheet having a front side and a back side, both the front side and the back side comprising a first coating having an average thickness in the range from 0.5 to 10 μm, wherein the first coating of the front side contains particles, which release divalent or multivalent metal ions upon the action of an acid, in a such an amount that a self-depositing coating agent forms, upon contact with the front side, a second coating thereon, whereas the first coating of the back side contains no particles, which release divalent or polyvalent metal ions upon the action of an acid, in such a quantity that a self-depositing coating agent, upon contact with the back side, forms a second coating thereon. The term "self-depositing coating agent," and its deposition mechanism, have already been explained in introductory fashion.

The invention also encompasses a metal sheet, as described above, that comprises on the first coating of the front side a deposited self-depositing coating agent. The latter can be freshly deposited and not yet cured, or else can be present in a cured state.

In one embodiment a metal sheet is provided having a front side, a back side and an edge extending therebetween, the front side and the back side comprising a first coating having an average thickness ranging from 0.5 to 10 μm, and optionally a conversion layer deposited on at least one of said front and back sides beneath the first coating, the first coating of the front side further comprising particles, said particles being selected such that upon action of an acid said particles release divalent or multivalent metal ions in such an amount that upon contacting the front side with a self-depositing coating agent, a second coating forms on the first coating of the front side, whereas the first coating of the back side contains no particles that release divalent or polyvalent metal ions upon action of an acid, in such a quantity that the self-depositing coating agent, upon contact with the back side, forms the second coating thereon.

In one embodiment a metal sheet is provided wherein the first coating of the front side contains at least 10 vol % particles that release divalent or polyvalent metal ions upon action of the acid, and the first coating of the back side contains no more than 5 vol % particles that release divalent or polyvalent metal ions upon action of the acid.

The particles that release divalent or polyvalent metal ions upon action of an acid can be particles of:

- metals selected from iron, zinc, nickel, manganese, magnesium, and aluminum;
- alloys that contain at least 50 wt % of one of said metals; and/or
- compounds of divalent and/or polyvalent metals.

In one embodiment a metal sheet is provided wherein the first coating of the front side and/or the first coating of the back side contains organic polymers.

In one embodiment the metal sheet comprises a conversion layer on the front side and/or back side beneath the first coating.

In one embodiment the metal sheet further comprises on the first coating of the front side, as a second coating, a deposited self-depositing coating agent. This second coating may contain organic polymers. In one embodiment, the second coating contains colored pigments, desirably black pigments. Desirably, the second coating has an average thickness ranging from 5 to 25 μm, preferably 10 to 20 μm.

In one embodiment the metal sheet has an edge which is not coated with the first coating but is coated with the second coating.

Another aspect of the invention provides a method for manufacturing a metal sheet, comprising steps of:

a) optionally cleaning an uncoated metal sheet or metal strip;

b) optionally subjecting the uncoated metal sheet or metal strip to a conversion treatment;

c1) contacting the front side with a first coating agent comprising said particles that, after drying and/or baking, generates the first coating of the front side;

c2) contacting the back side with a second coating agent that, after drying and/or baking, generates the first coating of the back side, wherein steps c1) and c2) are carried out simultaneously or in a sequence, and d) contacting the metal sheet having the first coating of the front side and the first coating of the back side, with a self-depositing coating agent comprising an acid, resulting in formation of the second coating on the front side; and e) drying or baking the second coating.

In one embodiment, the metal sheet is cut up between steps c) and d) thereby producing metal sheet portions having edges that have no coating corresponding to the first coating of the front side or the first coating of the back side and wherein in step d) the self-depositing coating agent forms the second coating on the edges and the metal sheet portions corresponding to the front side of the metal sheet.

In one embodiment a metal sheet is provided comprising:

a. a front side having a first coating (a) comprising organic polymer, b. a back side having a first coating (b) comprising organic polymer, and c. optionally a conversion layer deposited on at least one of said front and back sides beneath the first coating, the first coating (a) of the front side further comprising at least 10 vol % particles that release divalent or polyvalent metal ions upon action of acid on said particles;

wherein the metal sheet further comprises a second coating deposited on the first coating (a) of the front side, said second coating deposited by contacting the first coating (a) of the front side with a self-depositing coating agent comprising an acid thereby causing formation of the self-depositing coating.

Another aspect of the invention, includes an article that is made up at least in part of the aforedescribed metal sheet.

DETAILED DESCRIPTION OF THE INVENTION

A "metal sheet" is understood as a sheet of any shape, including a metal strip. As mentioned in introductory fashion, the metal sheet can be made of the usual structural metals such as, for example, iron or steel which can be galvanized or alloy galvanized or aluminized or alloy aluminized, zinc, aluminum, magnesium, titanium, and alloys that are made up of at least 50 wt % of one of the aforesaid metals. The metal sheet can be made in particular of electrolytically galvanized steel or of steel galvanized by the hot-dip method.

The terms "front side" and "back side" are defined by the manner of coating according to the present invention: the "front side" is understood as that side of the metal sheet that is to receive or has received a coating made up of a self-depositing coating agent. Upon later use of the coated metal sheet for the manufacture of articles such as, for example, vehicles, in which the metal sheet is formed or joined in such a way that cavities are produced, the front side is located on the outer side of those cavities. The back side forms the inner side of the cavities, and as a result is exposed to fewer corrosive attacks and needs to satisfy lesser aesthetic requirements. The first coating of the inner side is sufficient for these purposes, and no further over-coating of the first coating is necessary. A further coating of this kind is in fact to be avoided according to the present invention in order to save material and weight. Corresponding considerations apply if a metal sheet according to the present invention is joined by crimping or flanging: here the back side of the metal sheet ends up on the inner side of the flange or the crimped fold, while the front side of the metal sheet forms the outer side.

The "first coating" is understood to be the first coating of the respective side, which is applied onto the respective side. This does not, however, preclude the fact that the respective side has previously been subjected to a conversion treatment. This is discussed below. This layer formed by a potential conversion treatment is left out of consideration in enumerating the coating sequence, since it is optional and not mandatory. According to the present invention, the first coatings of the front side and of the back side differ from one another in that a self-depositing coating agent (also referred to as autodeposition coating agents or as a self-depositing or autodeposition resin) can become deposited onto the first coating of the front side. This is not intended to be the case, according to the present invention, on the first coating of the back side. This makes it necessary for the composition of the first coating of the front side to differ from that of the back side.

The first coating of the front side differs from the first coating of the back side at least in that the first coating of the front side can, upon action of the acid of the self-depositing coating agent, release divalent or polyvalent metal ions in a quantity such that the resin dispersion of the self-depositing coating agent is destabilized by them, so that the latter precipitates onto the first coating of the front side thereby forming a second coating. The first coating of the back side, conversely, is intended to contain no particles that can release divalent or polyvalent metal ions upon action of the acid component of the self-depositing coating agent, or only so few that their concentration on the back side is not sufficient to cause deposition of the resin component of the self-depositing coating agent.

Because of this differing structure of the first coating on the front side and on the back side, the metal sheet equipped with the respective first coating can be brought completely into contact with the self-depositing coating agent. The latter precipitates only on the front side, but not on the back side. On the one hand, this simplifies targeted application of the second coating only onto the front side. On the other hand, however, it may happen that the first coating of the back side exhibits cracks or defects at which a corrosive attack can occur during later use. Because the acid of the self-depositing coating agent can attack such defects and can dissolve metal ions out of the metal substrate, the resin component of the self-depositing coating agent becomes deposited at such defects, and covers them. This spot deposition of the self-depositing coating agent at defects in the first coating of the back side improves corrosion protection there, and is therefore desirable.

The average thickness of the first coating of both the front side and the back side is intended to be at least 0.5 μm, by preference at least 1 μm, in each case. An average thickness of more than 10 μm is, however, not necessary. The maximum value of the average thickness is by preference 5 μm, and in particular 3 μm. The term "average thickness" in this context takes into consideration the fact that the surface of the first coating of, in particular, the front side can be uneven because of the presence of particles. The first coating is thus intended to exhibit the aforesaid thickness on average, local deviations upward and downward being possible depending on the distribution of the particles and their thickness. The average thickness can be determined, for example, with an eddy-current method. Alternative, it can be measured on a cross section of the coated sheet using a scanning electron microscope. The average thickness can furthermore be determined by detaching the coating and, with a knowledge of the denseness of the coating, calculating the average thickness of the coating from the difference in weight.

The first coating of the front side must accordingly contain a sufficient quantity of particles that release divalent or polyvalent metal ions upon action of an acid. The first coating of the back side should by preference contain no such particles at all. Such particles in the first coating of the back side are, however, not deleterious in small quantities. All that is necessary is to ensure that when the self-depositing coating agent acts on the back side of the metal sheet, divalent or polyvalent metal ions are not released from the first coating in a quantity such that the resin component of the self-depositing coating agent precipitates there. These conditions are met, for example, if the first coating of the front side contains at least 10 vol %, by preference at least (with increasing preference) 20 vol %, 30 vol %, or 50 vol %, particles that release divalent or polyvalent metal ions upon action of an acid. The weight proportion to which this corresponds depends on the specific weight of said particles, which weight can be very different. Conversely, it is preferred that the first coating of the back side contain no more than 5 vol %, by preference no more than 3 vol %, and in particular no more than 1 vol %, particles that release divalent or polyvalent metal ions upon action of an acid.

The size of the particles that release divalent or polyvalent metal ions upon action of an acid must be limited so that they are in consonance with the desired average thickness of the first coating. In the direction of their smallest extension, the particles are to exceed the desired average thickness of the coating by no more than 100%. By preference, the particles have, at the point of their smallest extension, a thickness of no more than the desired average thickness of the coating; by preference, the thickness of the particles at the point of their smallest extension is less than that. It is therefore preferred that the particles that release divalent or polyvalent metal ions upon action of an acid have a shortest axis having a length in the range from 0.01 to 5 μm, by preference up to 3 μm. With approximately spherical particles, this can be ascertained using light-scattering methods or by filtration through filters of a defined pore size. In the case of particles deviating greatly from a spherical shape, for example flakes, this is preferably determined by scanning electron microscopy. For exactly spherical particles, the length of the shortest axis corresponds to the particle diameter. For flake-shaped particles, the shortest axis is that which is perpendicular to the plane of the flake.

The particles that release divalent or polyvalent metal ions upon action of an acid can be made of a variety of materials. For example, they can be metallic particles, in particular particles of iron, zinc, nickel, manganese, magnesium, or aluminum, or alloys that contain at least 50 wt % of one of said metals. The particles can furthermore represent, for example, compounds of divalent or polyvalent metals such as, in particular, phosphates, oxides, or hydroxides, from which the metal ions are released upon action of an acid. Examples thereof are phosphates, oxides, or hydroxides of the metals recited above, but also $TiO_2$, $ZrO_2$, and calcium phosphate or magnesium phosphate.

By preference, both the first coating on the front side and back side, and the second coating, contain organic polymers. In the first coating in particular, the polymers can be uncrosslinked. Examples thereof are: polyvinyl alcohol, polymers or copolymers of vinylpyrrolidone, polymers or copolymers of acrylic acid, methacrylic acid, or maleic acid, polyesters, linear polyurethanes, polymers or copolymers of amino-substituted polyvinylphenols. The polymers can, however, also already be crosslinked before formation of the coating, or can crosslink after formation of the coating. In the former case they harden by physical drying upon evaporation of the solvent or suspension agent. In the second case they crosslink by chemical reaction, which can be induced e.g. by heating or by radiation.

Crosslinked or crosslinking organic polymers that are known in the existing art for such coating purposes can be used for this in each case. This has already been discussed in the introduction. The polymer types and crosslinking and curing or drying mechanisms recited there can be transferred to the coatings and coating agents to be used in the context of this invention.

The first coating can be formed using coating agents that are known in the existing art. For example, the first coating of the front side can be produced in accordance with Examples 1 to 3 of WO 96/02384. It is also possible to employ, for the first coating of the front side, coating agents that are known in the existing art as "welding primers" or as "weldable coatings." These contain, in an organic polymer matrix, electrically conductive pigments that impart to the coating sufficient electrical conductivity to make the sheets coated therewith electrically weldable. If the conductivity pigments used here represent metals or metal compounds such as, for example, oxides, which release divalent or polyvalent metal ions upon attack by an acid, such weldable coatings are suitable as a first coating of the front side in the context of the present invention. Those known weldable coatings that contain metallic zinc, aluminum, iron, or iron oxides as a conductivity pigment are, for example, suitable.

One example of a coating agent of this kind that can be used to form the first coating of the front side is described in WO 99/24515. This document discloses conductive and weldable corrosion protection compositions based on (blocked) polyurethane resins, epoxy resins and nitrogen-containing hardeners, and conductive fillers. If zinc or aluminum is selected from the selection of conductive fillers indicated in this document, the corresponding coating agent is suitable for the present purpose. Reference is made to the aforesaid document regarding more details of the composition.

WO 01/30923 likewise describes an electrically conductive coating that, when zinc or aluminum is selected as a conductivity pigment, can serve as a first coating of the front side in the present invention. The organic binding agent used here is notable for the fact that it already cures at a relatively low article temperature in the range from 130 to 159° C. This binding agent can be selected, for example, from polyurethane/acrylate copolymer dispersions, polyurethane/polycarbonate dispersions, polyurethane/polyester dispersions, and acrylate/copolymer dispersions, as well as mixtures thereof. More details as to suitable compositions may be gathered from the exemplifying embodiments of this document, in which context the iron phosphide used therein as a conductivity pigment would need to be replaced by zinc or aluminum. Compositions that can be used as a first coating of the front side can likewise be arrived at if, in the exemplifying embodiments of the aforesaid document, iron phosphide is replaced by other components such as, for example, metallic iron or iron oxide, or in general by metals or metal compounds that release divalent or polyvalent metal ions upon attack by an acid.

Further coating agents suitable as a first coating of the front side are disclosed by WO 01/85860, provided zinc or aluminum is selected as a conductivity pigment or, instead of the conductivity pigments recited therein, a metal or metal compound is used that furnishes divalent or polyvalent metal ions upon attack by an acid. According to this document, the coating agent contains an organic binding agent containing at least one epoxy resin, at least one hardener selected from cyanoguanidine, benzoguanamine, and plasticized urea resin, as well as at least one amine adduct selected from polyoxyalkylenetriamine and epoxy resin amine adducts. More details as to composition may be gathered from the aforesaid document and, in particular, its exemplifying embodiments, in which context iron phosphide would need to be replaced, as a conductive pigment, by the metals or compounds already recited by way of example that release divalent or polyvalent metal ions upon action of an acid.

The first coating of the back side can be embodied analogously to the first coating, described above, of the front side, although in contrast thereto, no pigments that release divalent or polyvalent metal ions upon action of an acid are used. In other words, the conductivity pigments mentioned in the documents cited above are omitted, or they are selected from carbon black or graphite. This procedure reduces the variety of products to be used, since it is possible to use the same basic product for the first coating of the front side and of the back side, one of the aforesaid pigments that furnish divalent or polyvalent metal ions upon action of an acid being additionally added to the product for coating of the front side.

The composition of the agent for depositing the first coating of the back side can, however, also be selected independently of the agent for depositing the first coating of the front side. Possible coating agents for this, in general, are those that are known in the existing art as so-called "primers." The only condition to be applied to these is the one mentioned above regarding the maximum concentration of particles that release divalent or polyvalent metal ions upon contact with acid. A coating agent as described in German Patent Application DE 10 2006 039 633, for example, can be used. This contains fluoro complex ions of titanium and/or zirconium (which are incorporated into the completed layer in such a way that they do not dissolve, under the influence of an acid, to such an extent that a self-depositing coating agent becomes deposited onto said coating); at least one corrosion protection pigment; and at least one organic polymer, water-soluble or water-dispersible in the pH range from 1 to 3, that as such in aqueous solution, at a concentration of 50 wt %, exhibits a pH in the range from 1 to 3. More detailed information as to the configuration of this polymer may be gathered from the aforesaid document, as well as concrete examples of such compositions. The cations recited therein as further optional components of the coating agent should, however, be dispensed with.

Those compositions that are described in German Patent Application 10 2007 001 653 can further be used as agents for depositing the first coating of the back side. In this context, however, either the conductivity pigment also respectively used there must be entirely omitted, or carbon black or graphite must be selected as a conductivity pigment. In addition, the pigments listed therein as optional components, which pigments can release divalent or polyvalent metal ions upon action of an acid, must be omitted.

The second coating can be applied, for example, by the action of a self-depositing coating agent such as the one described in Example 4 of WO 96/02384. This represents an aqueous solution or suspension of acrylic resin latex, carbon black, iron fluoride, and hydrofluoric acid, and has a pH in the range from 1 to 4. It additionally contains hydrogen peroxide. The solids content (total of resin and carbon black) is 4 to 10 wt %. Further suitable agents for producing the second coating are mentioned in the cited documents WO 97/07163, U.S. Pat. No. 6,312,820, WO 03/026888, WO 03/042275, and the further documents cited therein. For example, the self-depositing coating agents can be made up of anionically functionalized epoxy resins such as those described in further detail in WO 03/042275, Anionic functionalization of the epoxy resins can be accomplished, for example, by incorporating sulfonate, sulfate, phosphate, phosphonate, or carboxylate groups. This epoxy resin dispersion preferably contains additional hardeners such as those described on page 12, line 25 to page 14, line 22 of the aforesaid document. The self-depositing coating agent additionally contains a "self-deposition accelerator" (so called therein) that can partly dissolve the metal surface and thereby release the metal ions that bring about deposition of the resin. Compounds to be selected for this by preference are described on page 15, line 19 to page 16, line 17 of WO 03/042275. Acids are especially suitable for this purpose, for example hydrofluoric acid, hexafluorosilicic acid, hexafluorotitanic acid, acetic acid, phosphoric acid, sulfuric acid, nitric acid, peroxy acids, citric acid, or tartaric acid. This function can furthermore be assumed by hydrogen peroxide or iron(II) ions. Substances of this kind are commonly known as "deposition accelerators" in self-depositing coating agents, and can also be used in the context of the present invention, regardless of which organic polymer component contains the self-depositing coating agent.

A self-depositing coating agent likewise usable in the context of the present invention contains a mixture of dispersed epoxy resin and dispersed acrylic resin such as the one explained further in WO 03/026888. Here as well, hardeners are preferably additionally present, such as those described further on page 7, line 15 to page 9, line 23 of the aforesaid document. Also preferably present, once again, are "self-deposition accelerators" such as those that have been enumerated above.

Self-depositing coating agents can also be based on other anionically functionalized resins. For example, polymers or copolymers of acrylic acid, methacrylic acid, and maleic acid can be used. A further group of self-depositing coating agents contains poly(alkylene chloride), for example the stabilized vinylidene chloride resin described further in U.S. Pat. No. 6,312,820, as a resin component. This can be present as a copolymer with vinyl chloride. Anionically functionalized polyvinyl chloride can in turn serve as the basis for a self-depositing coating agent.

The second coating preferably contains black or colored pigments, in particular carbon black. This on the one hand serves aesthetic purposes, and on the other hand permits easy visual monitoring of the uniformity and continuity of the second coating. In addition to or instead of these black or colored pigments, the second coating can contain further pigments. Examples are lamellar or non-lamellar pigments that, in particular, improve corrosion protection. A specific example thereof is calcium-containing silicates, which are known e.g. under the name "Shieldex®." The second coating can furthermore contain components that reduce friction and thereby improve formability. Examples thereof are waxes or inorganic pigments having a layered structure, for example graphite or molybdenum sulfide. Layered silicates such as, for example, talc are also suitable for this purpose.

The second coating of the front side preferably has an average thickness with a lower limit of at least 5, by preference at least 10 μm, and an upper limit of 25, by preference 20 μm. The average thickness can be, for example, in the range from 11 to 14 μm. The statements made above in connection with the average thickness of the first coating apply correspondingly with regard to the term "average thickness." The same is also true for the methods of determining the average thickness.

The first coating can be applied directly onto a bare metal surface. In order to improve the corrosion protection and/or adhesion of the first coating on the metal surface, however, the metal sheet can comprise on at least one side, beneath the first coating, a conversion layer. This is understood as a layer that is created by a conversion treatment known in the existing art, in which metal ions from the metal sheet are incorporated into the coating. The best-known examples of such conversion treatments are: chromating; layer-forming or non-layer-forming phosphating; and action of an acid solution of complex fluorides of, in particular, the elements B, Si, Ti, and/or Zr. The latter in particular can also contain organic polymers. Common examples thereof are polymers or copolymers of acrylic acid, methacrylic acid, and maleic acid, polyvinyl alcohol, polyamines, polyimines, and amino-substituted polyvinylphenols. It is preferred in the context of the present invention that the metal sheet have been subjected, before deposition of the first coating, to a conversion treatment by the action of such a solution of complex fluorides.

The metal sheet can involve previously cut pieces onto which the corresponding coatings are applied after cutting. The cut edges are then also coated. By preference, however, the metal sheet according to the present invention is produced by the fact that the respective first coating is applied onto metal sheet in a strip method, if desired after a conversion treatment, onto the front side and the back side of the strip. The second coating can additionally be applied onto the side of the strip that thereby becomes the front side. In this state the strip can be transported to the user and there processed, in particular cut, formed by pressing, and joined to yield components. As a result of the coating according to the present invention, a decreased quantity of forming oil is required for forming by pressing. Forming oil can in fact be entirely omitted, which simplifies the cleaning necessary after pressing, and saves material.

The metal sheet coated in accordance with the present invention can, however, also be obtained by applying the first coating of the front side and the back side in a steel plant onto metal strip using the strip method, and transporting the strip in that state to the downline processor. There the metal strip is cut into sheets of the requisite size; this produces cut edges that extend from the front side to the back side. This also happens when holes are punched in such a metal sheet. These cut edges are then free of the first coating. If such cut edges end up in the interior of a crimped fold or a flange, they are particularly sensitive to corrosion because of their unprotected state. If, however, metal sheet that has only the first coating on the front side and the back side is brought into contact, after cutting or stamping, with the self-depositing coating agent in order to deposit the second coating, that agent then becomes deposited not only onto the front side of the sheet but also onto the cut edges, since divalent or polyvalent metal ions go into solution in sufficient quantity there as well. As a result, not only the front side but also the cut edges become covered with the second coating (the "second coating" on the cut edge representing the only coating). The cut edges thereby receive sufficient corrosion protection that no further corrosion protection actions are necessary after crimping or folding. In this specific embodiment, the metal sheet according to the present invention is therefore characterized in that it comprises at least one edge that extends from the front side to the back side and that does not comprise a coating corresponding to the first coating of the front side or back side, but does comprise a coating corresponding to the second coating of the front side.

In the course of further processing of the parts fabricated from the metal sheet according to the present invention, for example parts of vehicle bodies, the second coating can be further overpainted. This can be omitted from the first coating of the back side if the latter ends up in the interior of cavities produced in the context of joining.

In a second aspect, the present invention relates to an article that is made at least partly from the metal sheet according to the present invention. The latter can comprise further paint layers above the second coating. Articles of this kind can represent, for example, vehicles, architectural elements, metal furniture, or household appliances ("white goods"), or respective parts thereof. The articles according to the present invention can furthermore represent components of aircraft or of ships.

The present invention additionally relates to the use of a metal sheet according to the present invention for manufacture of the aforesaid articles. As already described, for manufacture of these articles the metal sheet according to the present invention is formed and joined and, if applicable, overpainted.

A further aspect of the present invention refers to a method for manufacturing a metal sheet described above, wherein an uncoated metal sheet or metal strip a) is cleaned if necessary, b) is subjected, if desired, to a conversion treatment, c1) the front side is brought into contact with a first coating agent that, after drying and/or baking, generates the first coating of the front side, c2) the back side is brought into contact with a first coating agent that, after drying and/or baking, generates the first coating of the back side, wherein steps c1) and c2) can be carried out simultaneously or in any sequence, and d) the metal sheet, equipped on the front side and back side with the first coating, is brought into contact with a self-depositing coating agent, with the result that the second coating is constituted on the front side, e) the second coating is dried and/or baked. "Drying" is understood in this context as a physical hardening of the polymer system by evaporation of the solvent or suspension agent. "Baking" refers to curing of the polymer system by chemical reactions such as those recited, for example, in the introduction. This curing by chemical reaction can be triggered by heating or by high-energy radiation (so-called "actinic radiation" such as, for example, UV or electron radiation).

With regard to the composition of the metal sheet and the conversion solutions and coating agents to be used, the statements made above correspondingly apply.

If the first coating is applied directly onto a freshly manufactured metal strip, for example onto galvanized steel strip after galvanizing, cleaning is not necessary. If, however, the metal sheet or metal strip has been stored, transported, or oiled prior to application of the first coating agent, and thereby contaminated, it may be advisable to clean it before application of the first coating agent. Such cleaning processes are usual and known in the existing art prior to a coating operation. Aqueous alkaline cleaners, in particular, are used for this. If desired, and as already explained above, a conversion treatment can be performed prior to application of the first coating agent.

Methods, in particular strip methods, with which the first coating agent can be applied on the front side and the back side of the metal sheet or metal strip are likewise known and usual in the existing art. Dip methods are less suitable, since the front side and the back side are to be treated differently. It is preferred to bring the front side and the back side separately into contact, simultaneously or in any sequence, with the first coating agent of the front side and the back side, respectively. This can be done, for example, by spraying and subsequent squeegeeing, or by roller application. The wet film thickness that results, after drying and/or baking, in the desired dry film thickness can be adjusted by adjusting the roller gap of the squeegeeing rollers or application rollers. As already described in the introduction, a variety of methods are known in the existing art for the drying or baking of, in particular, organic coatings. These can be used for the method according to the present invention.

As also already explained, application of the second coating can occur immediately after drying or baking of the first coating using the single-part or strip method. Spray or dip methods are particularly suitable for this. It is preferred in this context to bring both the front side and the back side into contact with the self-depositing coating agent, since defects in the coating of the back side can thereby be compensated for by local deposition of the self-depositing coating agent.

The metal sheet or metal strip can, however, also be stored and/or transported between the application of the respective first coating and the second coating. A particular embodiment of the method according to the present invention consists in the fact that the metal sheet or metal strip is cut up after application of the respective first coating and before application of the second coating, so that at least one edge is produced which extends from the front side to the back side and which has no coating corresponding to the first coating of the front side or back side. When the metal sheet cut up in this fashion is brought into contact with the self-depositing coating agent, the second coating agent becomes deposited not only on the front side but also on the cut edge, so that the latter is protected from corrosion.

If the metal sheet is stored and/or transported, or even oil-coated, between application of the first and the second coating, such that the first coating can become contaminated, it is advisable for the metal sheet equipped with the coating to be cleaned, for example using commercially usual alkaline cleaners, prior to application of the second coating. This corresponds, for example, to the procedure in Example 4 of WO 96/02384.

The present invention thus simplifies the manufacture of corrosion-protected components by reducing material utilization and working steps. The inner sides of cavities, of crimped folds, and of flanges are sufficiently protected from corrosion by the first coating of the back side. Additional corrosion protection actions, such as those hitherto usual in the existing art, are no longer necessary at these sites. In the particularly preferred embodiment of the method according to the present invention, cut edges are covered with a layer of the self-depositing coating agent and thereby protected from corrosion. Flooding of the cavities with wax, or electrolytic dip coating, is no longer necessary.

When corrosion stresses are mild and aesthetic requirements low, for example in mechanical engineering or industrial engineering, the second coating of the front side can represent the final coating. In order to improve corrosion protection and for greater aesthetic demands, for example in vehicle construction, the second coating can be overpainted, for example, using a filler and final coat, as is usual in automobile construction. The hitherto usual cathodic electrocoating operation as a first painting step can, however, be eliminated. The second coating instead assumes the function of the electrolytic dip-coating layer.

What is claimed is:

1. A metal sheet having a front side, a back side and an edge extending therebetween, the front side and the back side comprising a first coating applied directly onto bare metal surfaces of the front side and back side, the first coating of the front side further comprising particles, said particles being selected such that upon action of an acid said particles release divalent or multivalent metal ions in such an amount that upon contacting the front side with a self-depositing coating agent, a second coating forms on the first coating of the front side, whereas the first coating of the back side optionally contains particles that release divalent or polyvalent metal ions upon action of an acid, said particles on the back side being present in a concentration that is not sufficient to cause deposition of the self-depositing coating agent on the back side, the metal sheet further comprising on the first coating of the front side, as a second coating, a deposited self-depositing coating agent, wherein the edge is not coated with the first coating but is coated with the second coating.

2. The metal sheet according to claim 1, wherein the first coating of the front side comprises an organic polymer matrix and contains at least 10 vol % particles that release divalent or polyvalent metal ions upon action of the acid, and have a shortest axis having a length ranging from 0.01 to 5 μm, said particles being particles of:

metals selected from iron, zinc, nickel, manganese, magnesium, and aluminum;

alloys that contain at least 50 wt % of one of said metals; and/or compounds of divalent and/or polyvalent metals.

3. The metal sheet according to claim 1, wherein the first coating of the front side and/or the first coating of the back side contains organic polymers selected from vinylpyrrolidone polymers, vinylpyrrolidone copolymers, maleic acid polymers, maleic acid copolymers, polyesters, and polyurethanes.

4. The metal sheet according to claim 3, wherein the second coating contains colored pigments and has an average thickness ranging from 5 to 25 μm.

5. The metal sheet according to claim 1, wherein the particles that release divalent or polyvalent metal ions upon action of the acid are deposited in a single step by contacting with one first coating agent comprising organic polymer and said particles.

6. The metal sheet according to claim 1, wherein the first coating of the front side and/or the first coating of the back side contains organic polymers selected from crosslinked or crosslinking polymers.

7. The metal sheet according to claim 1, wherein the first coating of the front side and/or the first coating of the back side contains electrically conductive pigment and/or filler that impart to said coatings sufficient electrical conductivity such that said coatings are weldable.

8. The metal sheet according to claim 1, wherein the first coating of the front side and the first coating of the back side contain different organic polymers.

9. An article that is made up at least in part of the metal sheet according to claim 1.

10. A metal sheet having a front side, a back side and an edge extending therebetween, the front side and the back side comprising a first coating applied directly onto bare metal surfaces of the front side and back side, said first coating having an average thickness ranging from 0.5 to 5 μm, the first coating of the front side further comprising particles, said particles being selected such that upon action of an acid said particles release divalent or multivalent metal ions in such an amount that upon contacting the front side with a self-depositing coating agent, a second coating forms on the first coating of the front side, whereas the first coating of the back side contains no particles that release divalent or polyvalent metal ions upon action of an acid, in such a quantity that the self-depositing coating agent, upon contact with the back side, forms the second coating thereon; wherein the metal sheet further comprises on the first coating of the front side, as a second coating, a deposited self-depositing coating agent and the edge is not coated with the first coating but is coated with the second coating.

11. The metal sheet according to claim 10, wherein the first coating of the front side comprises an organic polymer matrix and contains at least 10 vol % particles that release divalent or polyvalent metal ions upon action of the acid, and the first coating of the back side contains no more than 5 vol % particles that release divalent or polyvalent metal ions upon action of the acid.

12. The metal sheet according to claim 10, wherein the particles that release divalent or polyvalent metal ions upon action of the acid have a shortest axis having a length ranging from 0.01 to 5 μm.

13. The metal sheet according to claim 10, wherein the particles that release divalent or polyvalent metal ions upon action of an acid are particles of:

metals selected from iron, zinc, nickel, manganese, magnesium, and aluminum;

alloys that contain at least 50 wt % of one of said metals; and/or compounds of divalent and/or polyvalent metals.

14. The metal sheet according to claim 10, wherein the first coating of the front side and/or the first coating of the back side contains organic polymers selected from vinylpyrrolidone polymers, vinylpyrrolidone copolymers, maleic acid polymers, maleic acid copolymers, polyesters, and polyurethanes.

15. The metal sheet according to claim 10, wherein the second coating contains organic polymers.

16. The metal sheet according to claim 10, wherein the second coating contains colored pigments.

17. The metal sheet according to claim 16, wherein the second coating contains black pigments.

18. The metal sheet according to claim 10, wherein the second coating has an average thickness ranging from 5 to 25 μm.

19. The metal sheet according to claim 18, wherein the second coating has an average thickness ranging from 10 to 20 μm.

20. The metal sheet according to claim 10, wherein the particles that release divalent or polyvalent metal ions upon action of the acid are deposited in a single step by contacting with one first coating agent comprising organic polymer and said particles.

21. The metal sheet according to claim 10, wherein the first coating of the front side and/or the first coating of the back side contains organic polymers selected from crosslinked or crosslinking polymers.

22. The metal sheet according to claim 10, wherein the first coating of the front side and/or the first coating of the back side contains electrically conductive pigment and/or filler that impart to said coatings sufficient electrical conductivity such that said coatings are weldable.

23. The metal sheet according to claim 10, wherein the first coating of the front side and the first coating of the back side contain different organic polymers.

24. An article that is made up at least in part of the metal sheet according to claim 10.

25. A method for manufacturing a metal sheet according to claim 10, comprising steps of:

a. optionally cleaning an uncoated metal sheet or metal strip;

b. optionally subjecting the uncoated metal sheet or metal strip to a conversion treatment;

c1) contacting the front side with a first coating agent comprising said particles that, after drying and/or baking, generates the first coating of the front side;

c2) contacting the back side with a second coating agent that, after drying and/or baking, generates the first coating of the back side, wherein steps c1) and c2) are carried out simultaneously or in a sequence, and d) contacting the metal sheet having the first coating of the front side and the first coating of the back side, with a self-depositing coating agent comprising an acid, resulting in formation of the second coating on the front side and on the edge; and e) drying or baking the second coating.

26. The method of claim 25, wherein the metal sheet is cut up between steps c) and d) thereby producing metal sheet portions having edges that have no coating corresponding to the first coating of the front side or the first coating of the back side and wherein in step d) the self-depositing coating agent also forms the second coating on the edges.

27. A method for manufacturing a metal sheet according to claim 1, comprising steps of:

a. optionally cleaning an uncoated metal sheet or metal strip;

b. optionally subjecting the uncoated metal sheet or metal strip to a conversion treatment;

c1) contacting the front side with a first coating agent comprising said particles that, after drying and/or baking, generates the first coating of the front side;

c2) contacting the back side with a second coating agent that, after drying and/or baking, generates the first coating of the back side, wherein steps c1) and c2) are carried out simultaneously or in a sequence, and c. contacting the metal sheet having the first coating of the front side and the first coating of the back side, with a self-depositing coating agent comprising an acid, resulting in formation of the second coating on the front side and on the edge; and d. drying or baking the second coating.

28. The method of claim 27, wherein the metal sheet is cut up between steps c) and d) thereby producing metal sheet portions having edges that have no coating corresponding to the first coating of the front side or the first coating of the back side and wherein in step d) the self-depositing coating agent also forms the second coating on the edges.

* * * * *